United States Patent
Edelman et al.

(10) Patent No.: US 7,369,358 B2
(45) Date of Patent: May 6, 2008

(54) GROUNDED WRITER CORE

(75) Inventors: Harry S. Edelman, Minneapolis, MN (US); Bradley H. Miller, Minneapolis, MN (US); Eric L. Granstrom, Golden Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 407 days.

(21) Appl. No.: 10/772,972

(22) Filed: Feb. 5, 2004

(65) Prior Publication Data

US 2005/0174687 A1  Aug. 11, 2005

(51) Int. Cl.
G11B 5/147 (2006.01)
G11B 5/187 (2006.01)

(52) U.S. Cl. ................ 360/126; 360/128; 360/121

(58) Field of Classification Search ........... 360/125, 360/126, 317, 128, 121
See application file for complete search history.

(56) References Cited

U.S. PATENT DOCUMENTS

| | | | |
|---|---|---|---|
| 4,800,454 A | 1/1989 | Schwarz et al. | |
| 4,972,286 A * | 11/1990 | Jurisch et al. | 360/126 |
| 5,653,013 A | 8/1997 | Gill et al. | |
| 5,815,909 A | 10/1998 | Gray | |
| 6,038,106 A | 3/2000 | Aboaf et al. | |
| 6,154,345 A | 11/2000 | Ishiwata et al. | |
| 6,160,688 A | 12/2000 | Okumura | |
| 6,344,951 B1 | 2/2002 | Sato et al. | |
| 6,483,664 B2 | 11/2002 | Kamijima | |
| 6,853,517 B2 * | 2/2005 | Hirano et al. | 360/294.3 |
| 6,870,706 B1 * | 3/2005 | Zhu | 360/128 |
| 6,967,805 B1 * | 11/2005 | Hanchi et al. | 360/75 |
| 2005/0094316 A1 * | 5/2005 | Shiramatsu et al. | 360/234.5 |
| 2006/0103981 A1 * | 5/2006 | Kiyono et al. | 360/126 |

OTHER PUBLICATIONS

U.S. Appl. No. 10/464,343, filed Jun. 18, 2003, Singleton et al.
U.S. Appl. No. 10/715,695, filed Nov. 18, 2003, Mao et al.

* cited by examiner

Primary Examiner—Jefferson Evans
(74) Attorney, Agent, or Firm—Kinney & Lange, P.A.

(57) ABSTRACT

A transducing head includes a substrate, a writer having a writer core, and an electrical connector for grounding the writer, wherein the electrical connector electrically connects the writer core to the substrate.

19 Claims, 6 Drawing Sheets

GROUNDED WRITER CORE

BACKGROUND OF THE INVENTION

The present invention relates generally to magnetic data storage and retrieval systems. More particularly, the present invention relates to a transducing head having a writer grounded to a substrate.

Hard disc drives (HDDs) generally include a transducing head that reads data from and writes data to a magnetic storage medium, such as a disc having a number of concentric data tracks that store data in the form of localized magnetic fields, or bits. The transducing head includes a reader or read head. Several layers typically form the reader, including a top electrode, a bottom electrode and a magnetoresistive (MR) read sensor positioned between the top and bottom electrodes. The electrodes may also function as shields, where the shields ensure that the read sensor only reads that information stored directly beneath it on the magnetic disc.

As the read sensor is positioned above the localized magnetic fields of the rotating magnetic disc, a sense current passed through the MR read sensor allows detection of a time-dependent magnetic field modulation of a magnetization of the read sensor. Different types of MR read sensors are known, including current perpendicular to plane (CPP) readers and current in plane (CIP) readers. A CPP MR read sensor can be of a number of giant magnetoresistive (GMR) read sensor types, including, but not limited to, a tunneling giant magnetoresistive (TGMR) element or a spin valve (SV) element.

GMR read sensors have a series of alternating magnetic and nonmagnetic layers. The resistance of GMR read sensors varies as a function of the spin-dependent transmission of the conduction electrons between the magnetic layers separated by the nonmagnetic layer and the accompanying spin-dependent scattering, which takes place at the interface of the magnetic and nonmagnetic layers and within the magnetic layers.

GMR read sensors using two layers of ferromagnetic material separated by a layer of nonmagnetic electrically-conductive material are generally referred to as SV read sensors. The layers of a SV read sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV read sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR read sensors using two layers of ferromagnetic material separated by a layer of nonmagnetic electrically-insulating material are generally referred to as TGMR read sensors. The layers within a TGMR read sensor include an ultra-thin tunnel barrier layer positioned between a ferromagnetic pinned layer and a ferromagnetic free layer. As with SV read sensors, a magnetization of the free layer is allowed to rotate with respect to the pinned layer.

The transducing head also includes a magnetic writer, the writer including a writer core. The writer core generally includes an upper pole and a lower pole. A back via connects the upper and lower poles at a location spaced from the ABS. Disposed between the upper pole and lower pole is a writer coil, the writer coil including a number of turns of a conductor. A current passed through the writer coil creates a magnetic field. Modulation of the magnetic field generated by current in the writer coil allows the writer to record data by inducing a magnetization pattern on the magnetic disc.

A transducing head with a CPP reader typically uses the upper and lower shields to bring the sense current into and out of the reader. Because the MR read sensor is highly sensitive to noise, the upper and lower shields are isolated from noise sources. Noise generally refers to any undesired charges or currents introduced to the transducing head. The writer core is electrically isolated from the MR read sensor because the writer core can generate noise. In some CPP head configurations such as those with TGMR heads, an insulator, for example alumina ($Al_2O_3$) or silicon-dioxide ($SiO_2$), generally insulates the upper shield of the reader from the lower pole of the writer. In such designs, there is a danger of discharge across the insulator between the writer and the reader. Such a discharge to the highly sensitive MR read sensor poses a risk of thermal breakdown of the MR read sensor, causing performance degradation.

The transducing head is supported above the disc by a slider, the slider comprising a substrate. Typically, the reader is placed upon the substrate. The writer is typically placed adjacent the reader. An insulating basecoat is typically disposed between the reader and the substrate.

Bleeder resistors are well-known as a means of electrically connecting the reader and the substrate across the basecoat to limit damage due to electrostatic discharge (ESD) and/or electrical overstress (EOS). ESD generally describes actual discharges, while EOS describes a condition where the circuitry is exposed to voltages or currents that are higher than under normal operating conditions, such as may be experienced during electrical testing; however, because ESD and EOS refer to functionally related conditions, use of either term is hereafter intended to contain the other term. ESD typically arises from triboelectric charging or induction. The reader bleeder resistor generally is a thin film resistor, having a resistance on the order of 1-3 Megaohms ($M\Omega$), connected by a pair of vias to the reader and to the substrate. The reader bleeder resistor grounds the reader, typically grounding the reader to the electrically conductive substrate, to minimize or prevent ESD or EOS damage to the highly sensitive MR read sensor. The substrate is connected to the suspension assembly, which positions the transducing head relative to the disc. The suspension assembly is connected to the substrate with a conductive adhesive.

Reader bleeder resistors function to reduce accumulation of electrostatic charges on the reader, and thus limit damaging ESD events. A resistance of the reader bleeder resistor is selected to provide a path so that electrostatic charges on the highly sensitive reader are dissipated through the reader bleeder resistor to the substrate.

These reader bleeder resistors primarily protect the reader during fabrication of the HDD. However, because MR read sensors are highly sensitive to noise, reader bleeder resistors are constrained to high resistances to avoid introducing noise from the substrate to the reader. High resistances greatly reduce the likelihood of noise traveling through the reader bleeder resistor.

CPP heads use top and bottom magnetic shields to bring current into and out of the reader. The shields carry the sensor output to the preamp, and must therefore be isolated from noise sources, including the magnetic core of the writer. The preamp provides some control over voltages in the top and bottom shields. In traditional CIP heads, the shields and writer core are typically shorted together through a shared pole. However, some CIP configurations have the shields and writer core electrically isolated. In many CPP heads, such as TGMR heads, the writer core is electrically isolated. Isolation of the writer core allows the writer core voltage to "float", meaning the voltage of the writer core can fluctuate independent of other elements in the transducing head. The floating voltage of the writer core can reach voltages of one volt or more due to capacitive coupling to the writer coil and also due to tribocharging with the disc.

A number of factors may generate ESD or EOS during fabrication and/or operation of the HDD. During operation, longitudinal and perpendicular writers may exhibit a writer core voltage of one volt or more from tribocharging of the pole tip features during ABS contact with particles or with the magnetic disc. Additionally, during fabrication, charged objects may contact the transducing head causing ESD or EOS.

Both the reader and writer are sensitive to discharges. Discharges generate heat, which leads to a risk of core-to-coil and coil-to-reader thermal breakdown. Even writer core voltages of less than one volt create damaging discharges between the transducing head and the magnetic disc. Discharges also lead to damaged discs, and material from the disc can be transferred to a surface of the transducing head. Such material transfer generates defects on the disc, creates deposits on the surface of the transducing head that induce further contact between the head and the disc, and also affects the fly characteristics of the slider.

In addition, many designs, such as those utilizing TGMR heads, have a separating oxide that insulates the upper shield of the reader from the lower pole of the writer. In such designs, there is a danger of discharge across the separating oxide between the writer and the reader. Such a discharge to the highly sensitive MR read sensor poses a risk of damages to the MR read sensor, causing performance degradation.

Thus, a transducing head is needed to improve drive reliability by grounding the writer to control ESD between the transducing head and the disc, both in frequency and magnitude.

BRIEF SUMMARY OF THE INVENTION

The present invention relates to a transducing head that includes a substrate, a writer having a writer core, and an electrical connector for grounding the writer, wherein the electrical connector electrically connects the writer core to the substrate.

DETAILED DESCRIPTION

Figure 1:
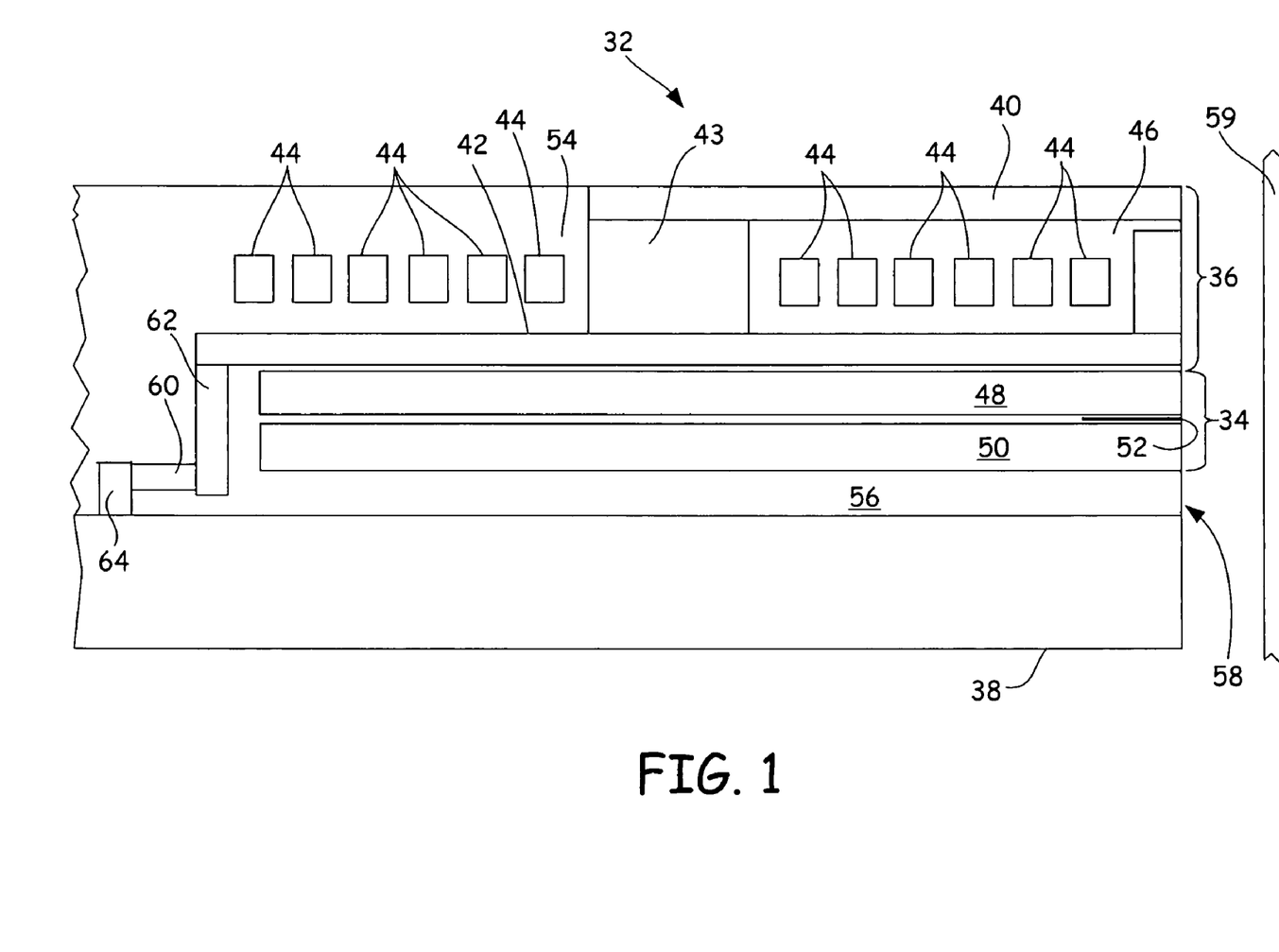
FIG. 1 is a partial cross-sectional view of a transducing head.

FIG. 1 shows a partial cross-sectional view of a transducing head 32, taken substantially along a centerline. Transducing head 32 comprises a reader 34, a writer 36 and a substrate 38. Reader 34 comprises several layers, including an upper shield 48, a lower shield 50, and a MR read sensor 52. Writer 36 includes one or more poles, such as an upper pole 40 and a lower pole 42, a back via 43, a writer coil 44, and an insulator 46. Insulators 54 and 56 are provided in transducing head 32. An air bearing surface (ABS) 58 is defined at an end of transducing head 32. ABS 58 is positioned relative a rotatable disc 59. An electrical connector, such as a resistor 60 (synonymously referred to as a grounding resistor) and/or a pair of vias 62 and 64 electrically connected to resistor 60, are positioned above substrate 38 for grounding writer 36. Resistor 60 is positioned normal to ABS 58 and opposite ABS 58 beyond upper and lower shields 48 and 50.

Reader 34 includes upper shield 48, lower shield 50, and MR read sensor 52. Reader 34 is located upon substrate 38, which is typically formed of an electrically conductive material AlTiC, TiC, Si, SiC, or other composite materials formed of combinations of these materials. Insulator 56 separates lower shield 50 of reader 34 from substrate 38. Upper shield 48 is parallel to lower shield 50. MR read sensor 52 is disposed between upper and lower shields 48 and 50. MR read sensor 52 and upper and lower shields 48 and 50 are generally parallel to each other, and also abut ABS 58. Insulator 56 extends between upper and lower shields 48 and 50, and is generally formed of an oxide, such as $Al_2O_3$, AlN, $SiO_2$, $Si_3N_4$, or $SiO_{0-2}N_{0-1.5}$. While insulator 56 is shown in FIG. 1 as a contiguous element, insulator 56 may be fabricated by depositing a number of layers of insulating material in transducing head 32.

Reader 34 allows a hard disc drive (HDD) to read data stored on disc 59. As transducing head 32 is positioned over rotating disc 59, a sense current is passed through upper and lower shields 48 and 50 of reader 34. Upper and lower shields 48 and 50 carry the sense current between MR read sensor 52 and a preamp (not shown). Upper and lower shields 48 and 50 also ensure that MR read sensor 52 only reads that information stored directly beneath it on disc 59. As MR read sensor 52 is positioned near localized magnetic fields that store data on disc 59, a resistance of MR read sensor 52 varies in relation to the localized magnetic fields. The effect of the dynamic resistance of MR read sensor 52 upon voltage in the MR read sensor 52 allows the HDD to read stored data.

MR read sensor 52 is a current perpendicular to plane (CPP) type. Generally, CPP MR sensors can be of a number of giant magnetoresistive (GMR) read sensor types, including, but not limited to, a tunneling giant magnetoresistive (TGMR) element or a spin valve (SV) element. In the preferred embodiment shown in FIG. 1, MR read sensor 52 is a tunneling giant magnetoresistive (TGMR) element. In further embodiments, MR read sensor is any CPP or current in plane (CIP) type arranged in a piggyback configuration.

Writer 36 includes upper pole 40, lower pole 42, back via 43, writer coil 44, and insulator 46. Writer 36 is supported on substrate 38 and is located adjacent reader 34 in a piggyback configuration (in which layers are not shared between writer 36 and reader 34). In further embodiments, other layers are disposed between reader 34 and writer 36. Upper and lower poles 40 and 42 define a writer core. Each of upper and lower shields 48 and 50, and upper and lower poles 40 and 42 are formed of metallic materials. Typically, each of these components is formed of an alloy primarily composed of Fe, Ni, and/or Co. Back via 43 connects upper and lower poles 40 and 42 at a location distal ABS 58.

Disposed between upper and lower poles 40 and 42 is writer coil 44, which comprises a number of turns of wire generally formed of an electrically-conductive metal, such as Cu, Au, or Ag. Writer coil 44 is electrically insulated from upper and lower poles 40 and 42 by insulator 46, which is disposed between upper pole 40 and lower pole 42 and formed of an insulating material, such as $Al_2O_3$, AlN, $SiO_2$, and $Si_3N_4$. Insulator 46 is disposed between upper and lower poles 40 and 42 to surround the turns of wire of writer coil 44. Writer coil 44 and upper and lower poles 40 and 42 are part of a common magnetic circuit, but are electrically insulated from each other by insulator 46. FIG. 1 shows writer 36 having two poles; however, in further embodiments, writer 36 is a perpendicular pole writer, which may have a writer core defined by a single pole. In still further embodiments, writer coil 44 has a helical configuration where writer coil 44 winds around a pole.

Writer 36 allows transducing head 32 to induce localized magnetic fields on rotating disc 59 to store data. As illustrated in FIG. 1, writer 36 in transducing head 32 includes the writer core (defined by upper and lower poles 40 and 42) and writer coil 44. Writer coil 44 is electrically connected to the preamp (not shown), which provides some control over a voltage in writer coil 44. A current passed through writer coil 44 creates a magnetic field. Upper and lower poles 40 and 42 create a magnetic circuit for the magnetic field, the magnetic circuit being connected at ABS 58. Modulation of the magnetic field generated by the current in writer coil 44 allows writer 36 to store data to disc 59 by inducing a magnetization of localized magnetic fields on portions of magnetic disc 59 located near writer 34, below ABS 58.

A transducing head with a TGMR element, such as transducing head 32 shown in FIG. 1, uses upper and lower shields 48 and 50 to bring the sense current into and out of reader 34. Because MR read sensor 52 is highly sensitive to noise, upper and lower shields 48 and 50 are isolated from the writer core (defined by upper and lower poles 40 and 42), which can generate noise. Noise generally refers to any undesired charge(s) or current(s) introduced to transducing head 32. FIG. 1 shows a TGMR head having an insulator 54 and an insulator 56, which insulates upper shield 48 of reader 34 from lower pole 42 of writer 36. Insulators 54 and 56 are generally formed of an oxide, such as $Al_2O_3$, AlN, $SiO_2$, $Si_3N_4$, or $SiO_{0-2}N_{0-1.5}$.

In many CPP heads, such as transducing head 32, the writer core (defined by upper and lower poles 40 and 42) is electrically isolated. Electrical isolation of the writer core allows a writer core voltage to "float", meaning the voltage of the writer core fluctuates independent of other elements in the transducing head. The floating voltage of the writer core can reach voltages of one volt or more from capacitive coupling to writer coil 44 and also due to tribocharging with disc 59.

Charges can accumulate in a HDD causing electrostatic discharge (ESD) and/or electrical overstress (EOS). ESD generally describes actual discharges, while EOS describes a condition where circuitry is exposed to voltages or currents that are higher than under normal operating conditions; however, because ESD and EOS refer to functionally related conditions, use of either term is hereafter intended to contain the other term. ESD arises from triboelectric charging or induction. In particular, contact between ABS 58 and, for example, disc 59 or airborne particles causes tribocharging, which generates harmful ESD and EOS effects.

Both reader 34 and writer 36 are sensitive to ESD and EOS. Even writer core voltages of less than one volt create discharges between transducing head 32 and magnetic disc 59 that degrade performance. Such discharges may generate heat, which leads to a risk of core-to-coil thermal breakdown in writer 36 as well as thermal breakdown of MR read sensor 52. Discharges also damage disc 59 when areas of disc 59 are heated. Such disc damage degrades performance in a number of ways, including, but not limited to: generating defects on disc 59; creating deposits on the surface of transducing head 32 that decrease reading or writing performance of transducing head 32 and/or induce further contact between transducing head 32 and disc 59; and adversely affecting fly characteristics of transducing head 32, which affects a clearance height maintained between transducing head 32 and disc 59. In addition, charges on the writer core of transducing head 32 can produce an electrostatic actuation (ESA) effect, which is an attraction or repulsion between transducing head 32 and disc 59. Such ESA effects undesirably interfere with the fly characteristics or fly height control of transducing head 32.

Methods are known in the art for grounding reader 34 to substrate 38. In further embodiments of the present invention, an optional reader bleeder resistor, of a type known in the art, is used to either dissipate voltage accumulation on reader 34 or minimize a voltage potential difference between reader 34 and disc 59. However, MR read sensor 52 is highly sensitive to noise. The optional reader bleeder resistor is of a relatively high resistance, on the order of 1-3 Mega-ohms (MΩ), in order to avoid introducing noise present on substrate 38 to reader 34. Such a reader bleeder resistor may be used in addition to resistor 60, which grounds writer 36 to substrate 38; however, use of resistor 60 does not require use of the optional reader bleeder resistor.

Writer 36 is not particularly susceptible to adverse consequences due to noise introduced into the writer core (defined by upper and lower poles 40 and 42). Resistor 60, which electrically connects the writer core and substrate 38, has a significantly lower resistance than typical reader bleeder resistors. The resistance of resistor 60 is between about 1 Ω and about 1 MΩ. This relatively low resistance allows current to more easily flow through resistor 60 to ground the writer core from smaller charges.

Resistor 60 is a thin film type resistor. Size and shape of resistor 60 vary according to known methods for establishing a desired resistance of resistor 60. The pair of vias 62 and 64 extend parallel to ABS 58 to electrically connect opposite ends of resistor 60 to substrate 38 and to the writer core. FIG. 1 shows via 62 connecting resistor 60 to the writer core at the lower pole 42. However, in further embodiments, the via 62 connects resistor 60 to the writer core at the upper pole 40.

Resistor 60 in FIG. 1 electrically connects the writer core to substrate 38, thereby providing a path so that electrostatic charges on the writer core are dissipated through resistor 60 to substrate 38. This provides several advantages. Resistor 60 functions to minimize a voltage potential between the writer core and other components, which suppresses voltage spikes capacitively coupled from writer coil 44 to other components in the first instance. By grounding writer 36, resistor 60 reduces a risk of discharge between the writer core and disc 59, between the writer core and writer coil 44, and between the writer core and reader 34. In addition, resistor 60 improves control over a fly height of transducing head 32 relative disc 59 by reducing charges on the writer core to thereby reduce undesired electrostatic actuation (ESA) effects, which cause attraction or repulsion of transducing head 32 to disc 59 due to charging.

In some instances, the grounded writer core provides an electrical path for discharges between the writer core and disc 59 to protect reader 36 from damaging discharges between reader 36 and disc 59. Specifically, the writer core acts like a lightning rod to accept small, frequent discharges between the writer core and disc 59. This "lightening rod" function dissipates a charge on disc 59 by initiating discharges to a safe or favorable point on transducing head 32 (namely the writer core), to protect sensitive portions of transducing head 32 (such as MR read sensor 52) from undesired discharges. In addition, this "lightening rod" function lowers a discharge threshold, reducing the energy associated with each individual ESD event, thereby mitigating possible damage to portions of transducing head 32 or disc 59 due to ESD.

Transducing head 32 of the present invention is manufactured using conventional techniques. Components of transducing head 32 are generally formed as thin films deposited by conventional means, such as physical vapor deposition, sputtering, evaporation or a low temperature plasma-enhanced chemical vapor deposition process. Additional processes such as photo or chemical etching may be used to further pattern or process transducing head 32 during fabrication. Resistor 60 is fabricated using the same processes known for fabricating reader bleeder resistors.

Figure 1A:
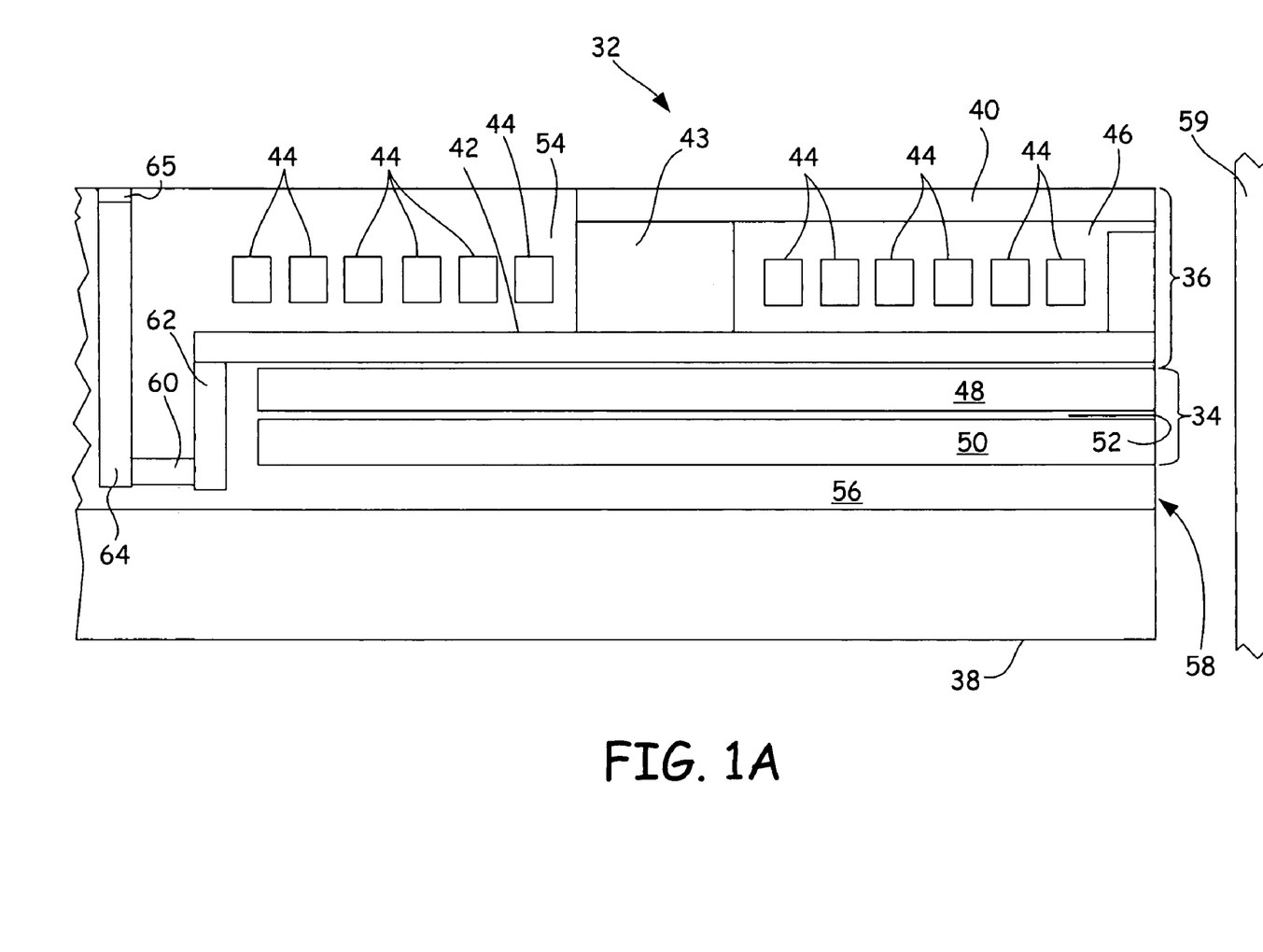
FIG. 1A is a partial cross-sectional view of a further embodiment of the transducing head shown in FIG. 1.

FIG. 1A shows a partial cross-sectional view of another embodiment of transducing head 32 shown in FIG. 1. In this embodiment, substrate 38 is formed of an electrically insulating material, and transducing head 32 further includes an electrically grounded pad 65 located on transducing head 32 opposite substrate 38. Those skilled in the art will recognize that pad 65 may be located elsewhere on transducing head 32. Pad 65 is of a well-known type used to electrically connect various components to a transducing head. Resistor 60 electrically connects the writer core (defined by upper and lower poles 40 and 42) to pad 65 for electrically grounding writer 36. In further embodiments, pad 65 is connected to other components, such as an interconnect circuit (not shown) that is electrically connected to a system ground located in the HDD.

Figure 2:
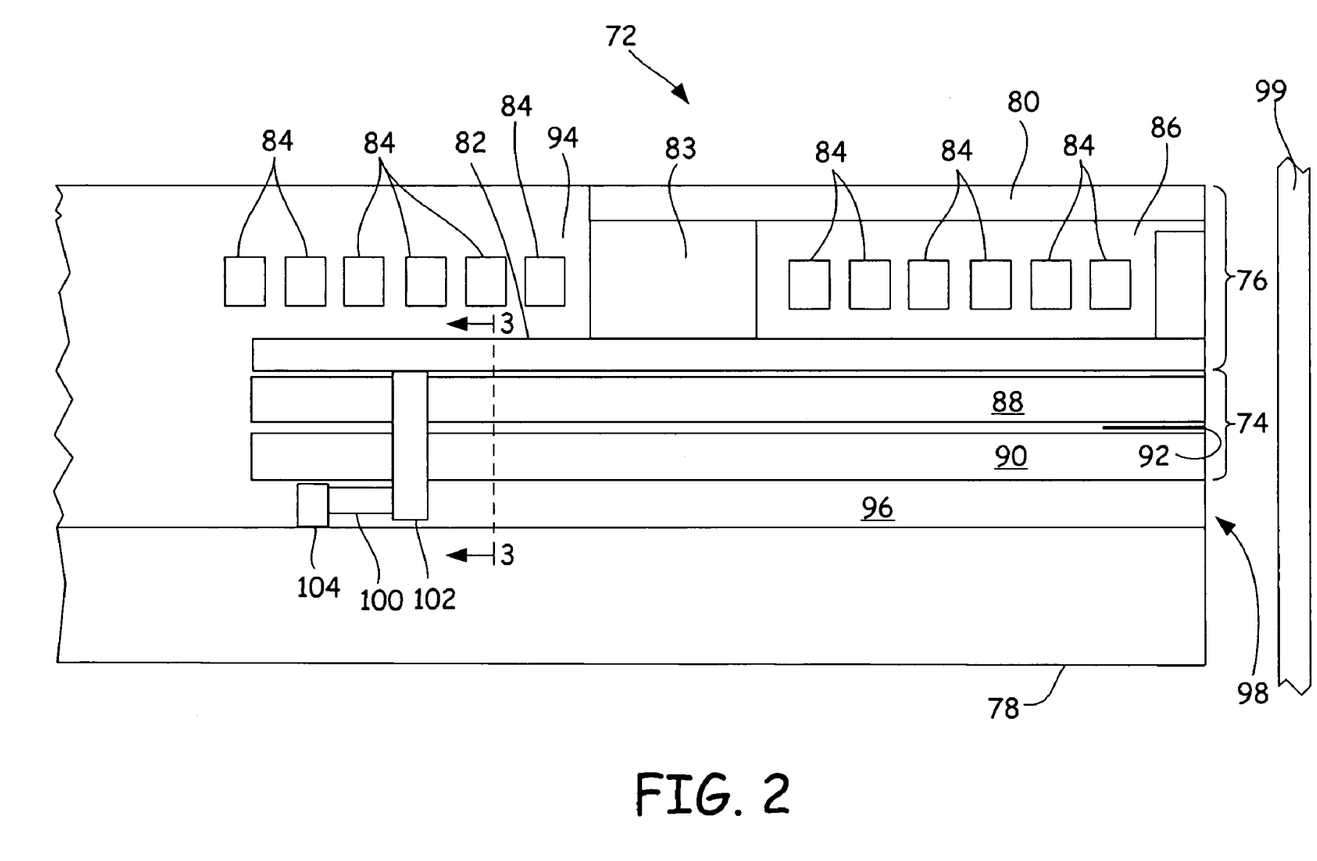
FIG. 2 is a partial cross-sectional view of a further embodiment of a transducing head.
Figure 3:
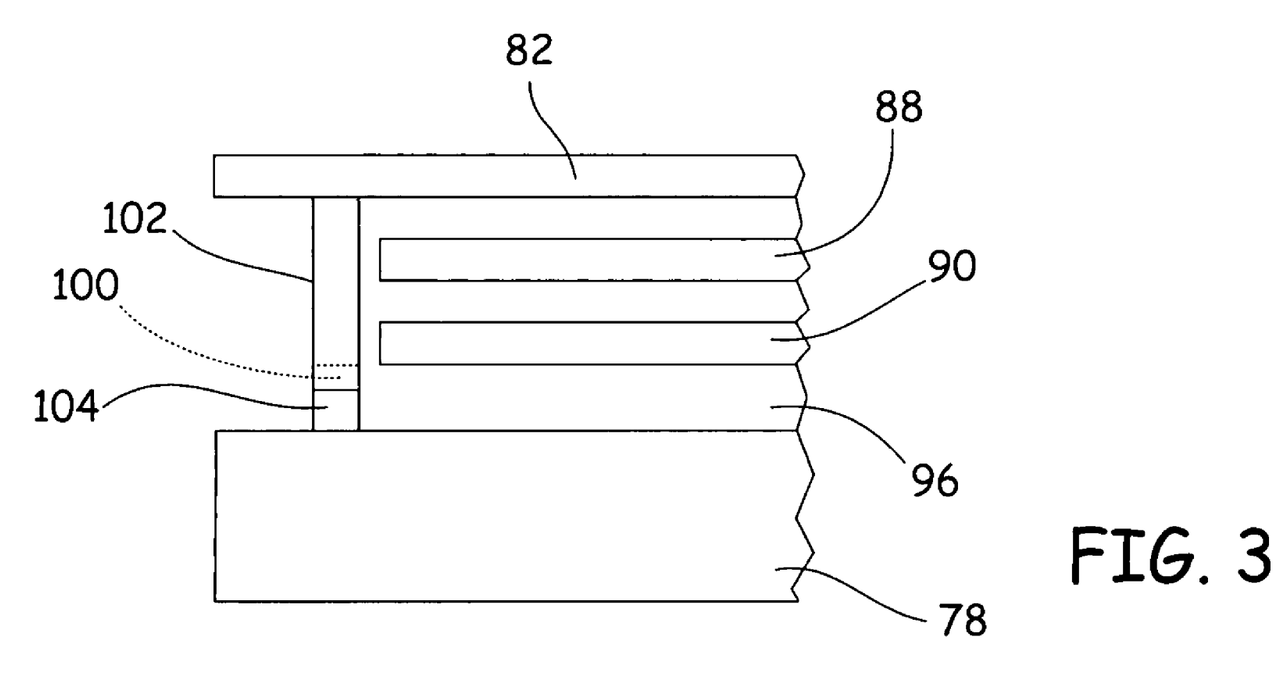
FIG. 3 is a simplified schematic view of a cross-section of a portion of the transducing head shown in FIG. 2.

FIGS. 2 and 3 illustrate another embodiment of a transducing head 72. FIG. 2 is a partial cross-sectional view of transducing head 72, taken along a centerline. FIG. 3 is a simplified schematic view of a cross-section of a portion of the transducing head taken along line 3-3 of FIG. 2. Transducing head 72 comprises a reader 74, a writer 76, and a substrate 78. Writer 76 comprises an upper pole 80, a lower pole 82, a back via 83, a writer coil 84, and an insulator 86. Reader 74 comprises an upper shield 88, a lower shield 90, and an MR read sensor 92. A number of insulators 94 and 96 are also provided in transducing head 72. Transducing head 72 defines an ABS 98 facing a magnetic disc 99. An electrical connector, such as a resistor 100 and/or a pair of vias 102 and 104, is provided for grounding a writer core (defined as upper and lower poles 80 and 82). Resistor 100 is electrically connected to the writer core by via 102 and to substrate 78 by via 104.

Transducing head 72 in FIG. 2 has a configuration and functions similar to transducing head 32 illustrated and described with respect to FIG. 1. However, in the embodiment shown in FIGS. 2 and 3, the location of resistor 100 is alongside upper and lower shields 88 and 90, normal to ABS 98. As seen in FIG. 3, lower pole 82 is generally parallel to upper and lower shields 88 and 90, and extends beyond upper and lower shields 88 and 90 to allow via 102 to electrically connect resistor 100 and lower pole 82 without being obstructed by upper or lower shields 88 and 90. In further embodiments, upper pole 80 extends beyond lower pole 82, and upper and lower shields 88 and 90, and via 102 electrically connects upper pole 80 to resistor 100.

Those skilled in the art will recognize that the resistor 100, in other embodiments, is located in other locations in transducing head 72. Generally, resistor 100 could be located anywhere a reader bleeder resistor could be located, for example anywhere between the writer core (defined by upper and lower poles 80 and 82) and substrate 78. However, resistor 100 would generally not be positioned near ABS 98.

Figure 4:
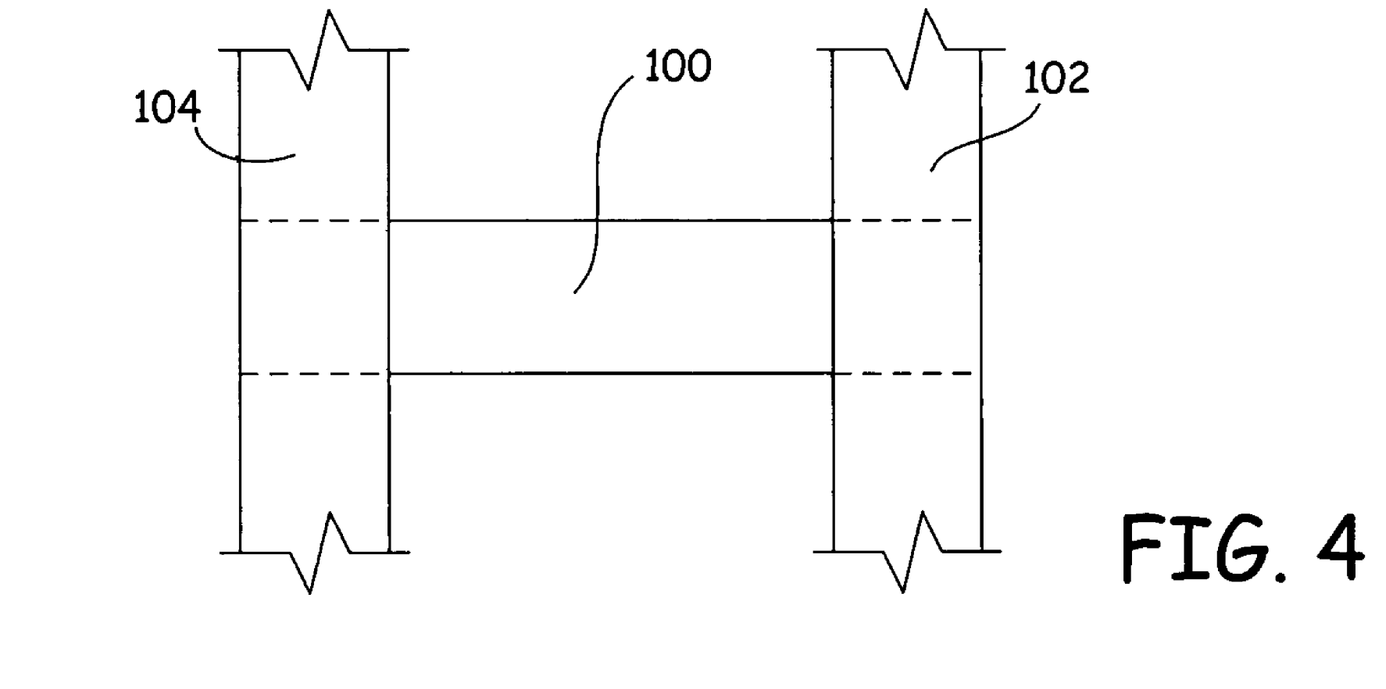
FIG. 4 is a simplified schematic view of a grounding resistor.

FIG. 4 is a simplified schematic view of a thin film resistor 100. A pair of vias 102 and 104 are provided at opposing ends of the resistor 100. Resistor 100 and vias 102 and 104 define an electrical connector. Vias 102 and 104 are of a standard type known in the art for electrically connecting resistor 100 to other components to form an electrical circuit, for example connecting resistor 100 to a substrate and a writer core.

Resistor 100 has a resistance, determined by a size and a shape of resistor 100. The resistance of resistor 100 in FIG. 4 for grounding a writer can be significantly lower than a resistance for a reader bleeder resistor. A resistance of resistor 100 is between about 1 Ω and about 1 MΩ, and is preferably about 1 Ω at a lower end of that range.

As described with respect to FIGS. 2 and 3, when connected to a transducing head, resistor 100 in FIG. 4 dissipates charges, such as electrostatic charges that accumulate on the transducing head, and/or minimizes a difference in voltage potential between components electrically connected to resistor 100.

Figure 5:
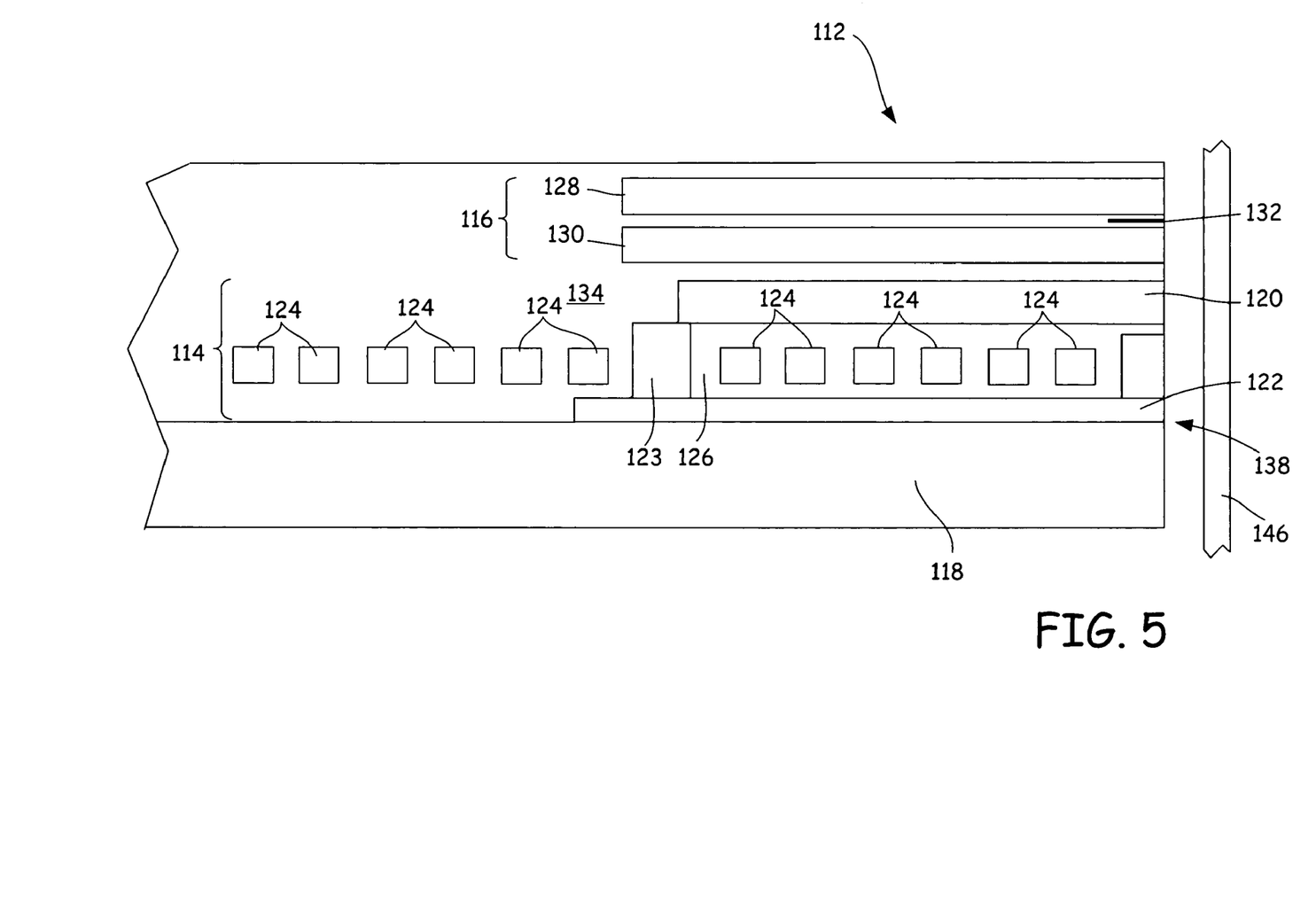
FIG. 5 is a partial cross-sectional view of a further embodiment of a transducing head.

FIG. 5 is a partial cross-sectional view of another embodiment of a transducing head 112. Transducing head 112 has a writer 114, a reader 116, and a substrate 118. Writer 114 comprises an upper pole 120, a lower pole 122, a back via 123, a writer coil 124, and an insulator 126. Upper pole 120 and lower pole 122 of writer 114 define a writer core. Reader 116 comprises several layers including an upper shield 128, a lower shield 130, and an MR read sensor 132. An insulator 134 is further provided in transducing head 112. Transducing head 112 defines an ABS 138 that faces a magnetic disc 146.

Transducing head 112 in FIG. 5 is configured and functions similar to the previous embodiments; however, transducing head 112 is arranged in a modified piggyback configuration with writer 114 in electrical contact with substrate 118, and reader 116 located adjacent writer 114. No insulation is placed between lower pole 122 of writer 114 and substrate 118. Writer 114 is in direct physical and electrical contact with the substrate 118, thereby creating an electrical connection. In further embodiments, a conductive adhesive is provided where writer 114 directly contacts substrate 118.

Electrical contact between writer 114 and substrate 118 in FIG. 5 provides an inherent grounding function to writer 114. An electrical resistor connection across an insulator or basecoat located upon substrate 118 is not required to electrically connect writer 114 and substrate 118, because writer 114 has a direct electrical connection to substrate 118 that grounds the writer core (defined by upper and lower poles 120 and 122) to substrate 118. Electrical contact between lower pole 122 and substrate 118 grounds the writer core to minimize harmful effects of ESD or EOS.

Although the present invention has been described with reference to preferred embodiments, workers skilled in the art will recognize that changes may be made in form and detail without departing from the spirit and scope of the invention.

The invention claimed is:

1. A transducing head comprising:
   a substrate;

a writer having a writer core;

a reader electrically isolated from the writer such that the reader is not affected by fluctuations in voltage of the writer core;

an electrically insulating material, wherein the reader and the writer core are electrically isolated from one another by the electrically insulating material; and an electrical connector for grounding the writer, wherein the electrical connector electrically connects the writer core to the substrate.

2. The transducing head of claim 1 wherein the substrate and a storage medium have substantially the same electrical potential for reducing a risk of discharge between the writer core and the storage medium.

3. The transducing head of claim 1, wherein the reader is located upon the substrate and the writer is located adjacent the reader, and wherein the electrical connector includes a resistor for electrically connecting the writer core and the substrate.

4. The transducing head of claim 3 wherein the resistor has a resistance between about one (1) ohm and about one (1) mega ohm.

5. The transducing head of claim 3 wherein the resistor is a thin film resistor.

6. The transducing head of claim 1 wherein the substrate is formed of an electrically conductive material, and wherein the substrate is electrically grounded.

7. The transducing head of claim 1, and further comprising a reader, wherein the writer core provides an electrical path for discharges between the writer core and a storage medium to protect the reader from damaging discharges between the reader and the storage medium.

8. A transducing head comprising:

an electrical ground;

a reader positioned upon a substrate;

a writer having a writer core, the writer positioned adjacent the reader and electrically isolated from the reader such that the reader is not affected by fluctuations in voltage of the writer core;

an electrically insulating material, wherein the reader and the writer core are electrically isolated from one another by the electrically insulating material; and a resistor electrically connected between the writer core and the electrical ground for grounding the writer.

9. The transducing head of claim 8 wherein the resistor has a resistance between about one (1) ohm and about one (1) mega ohm.

10. The transducing head of claim 8, wherein the substrate is formed of an electrically conductive material, and the resistor is electrically connected to the substrate, and wherein the substrate is electrically connected to the electrical ground.

11. A transducing head comprising:

an electrical ground;

a reader positioned upon a substrate, wherein the substrate is formed of electrically insulating material;

a writer having a writer core, the writer positioned adjacent the reader;

a first electrically insulating material, wherein the reader and the writer core are electrically isolated from one another by the first electrically insulating material; and a resistor electrically connected between the writer core and the electrical ground for grounding the writer.

12. The transducing head of claim 11, wherein the electrical ground is electrically connected to a pad, and wherein the resistor electrically connects the writer core and the pad.

13. A transducing head comprising:

an electrical ground;

a reader;

a writer that is electrically isolated from the reader such that the reader is not affected by fluctuations in voltage of the writer; and a thin film resistor electrically connected between the writer and the electrical ground for grounding the writer.

14. The transducing head of claim 13 wherein the thin film resistor has a resistance of about one (1) ohm to about one (1) mega ohm.

15. The transducing head of claim 13, and further comprising a substrate, wherein the reader is positioned upon the substrate, and the writer is positioned adjacent the reader.

16. The transducing head of claim 13, and further comprising a substrate, wherein the writer is positioned upon the substrate, and the reader is positioned adjacent the writer.

17. The transducing head of claim 13 wherein the writer includes a writer core, the writer core being electrically connected to the thin film resistor.

18. The transducing head of claim 17, and further comprising an electrically insulating material, wherein the reader and the writer core are electrically isolated from one another by the electrically insulating material.

19. The transducing head of claim 13 and further comprising a substrate, wherein the substrate is formed of an electrically conductive material and the substrate is electrically connected to the electrical ground, and further wherein the thin film resistor is electrically connected to the substrate.

* * * * *